3,002,032
PROCESS FOR SEPARATING FLUORINATED ETHYLENES BY MEANS OF MERCURY COMPOUNDS
Otto Scherer and Helmut Hahn, both of Frankfurt am Main, and Gunter Schneider, Buchschlag, Germany, assignors to Farbwerke Hoechst Aktiengesellschaft vormals Meister Lucius & Bruning, Frankfurt am Main, Germany, a corporation of Germany
No Drawing. Filed Dec. 22, 1959, Ser. No. 861,223
Claims priority, application Germany Dec. 5, 1956
10 Claims. (Cl. 260—653.3)

This application is a continuation-in-part application of application Serial No. 700,299 filed December 3, 1957, now abandoned.

This invention relates to a process for separating fluorinated ethylenes.

It is known to react ethylene with mercury acetate dissolved in methanol. This reaction yields the methoxy mercury acetate compound of ethylene. It has also been proposed to separate saturated hydrocarbon-ethylene mixtures by linking ethylene to mercury acetate.

Tetrafluorethylene prepared in the usual manner contains small amounts of other olefins, chiefly 1.1-difluorethylene, which impair the polymerization considerably. In view of the fact that the boiling point of 1.1-difluorethylene (—83° C.) is very close to that of tetrafluorethylene (—78° C.), it is very difficult to separate these two substances from one another by distillation. Moreover, operating at so low a temperature requires considerable expense in frigorific energy.

It is, therefore, desirable to remove the disturbing secondary constituents from tetrafluorethylene in a more suitable manner.

Now we have found that many halogenated, especially fluorinated ethylenes react with mercury salts in alcohols or in water or in an aqueous-alcoholic solution already at room temperature.

It is suitable to operate at a temperature between about 0° C. and 100° C., preferably between about 20° C. and 70° C. In these temperature ranges the reaction velocity is already so high that a higher temperature can generally be dispensed with, but this does not exclude the use of a still higher temperature in a given case. The application of superatmospheric pressure may be advantageous and may reduce especially the volume of apparatus required, but the reaction proceeds well even under atmospheric pressure. It was especially surprising that the following fluorinated ethylenes, i.e.

$CF_2=CH_2$—1.1-difluorethylene
$CF_2=CHCl$—1.1-difluoro-2-chlorethylene
$CFCl=CH_2$—1-fluoro-1-chlorethylene, and
$CHF=CH_2$—1-fluorethylene react with the aforesaid mercury salts. These ethylenes are substituted by either two hydrogen atoms or two fluorine atoms at one carbon atom. Accordingly, there are two alternatives for the other carbon atom. In the first case it is substituted by at least one florine atom and possibly a further halogen atom or a hydrogen atom, while in the second case it is substituted by at least one hydrogen atom and possibly a further halogen atom other than fluorine. We have found, and this is surprising, that a series of further ethylenes does not react with mercury salts. These ethylenes are $CF_2=CF_2$—tetrafluorethylene
$CF_2=CHF$—trifluorethylene
$CF_2=CFCl$—trifluorochlorethylene
$CF_2=CCl_2$—1.1-difluoro-2.2-dichlorethylene, and
$CFCl=CHCl$—1-fluoro-1.2-dichlorethylene.

This latter type of ethylenes contain at least 3 fluorine atoms or, in addition to fluorine and possibly hydrogen, two further halogen atoms other than fluorine.

This different behavior of ethylenes enables halogenated ethylenes which do not react with mercury compounds to be separated from the type of ethylenes which react readily with mercury compounds.

Since the reaction depends practically exclusively on the presence of mercury, particularly in the form of bivalent mercury, there may be used, on principle, all mercuric salts that are at least partially soluble in the reaction media employed and are stable at the reaction temperatures applied. Thus, mercuric compounds such as mercuric oxide and mercuric salts with inorganic or more especially with organic acids may be used, especially the salts of aliphatic, cycloaliphatic and aromatic acids. For economical reasons simple and readily accessible acids are expediently used as salt component for the bivalent mercury. Particularly suitable are mercuric salts of aliphatic hydrocarbon monocarboxylic acids, preferably containing 2 to 8 carbon atoms (the term aliphatic hydrocarbon monocarboxylic acids is intended to include straight chain and branched hydrocarbon monocarboxylic acids), such as acetic acid, propionic acid, butyric acid, isobutyric acid, caproic acid, octanoic acids, ethyl hexanoic acid etc. Furthermore, there come into consideration mercuric salts of cycloaliphatic hydrocarbon monocarboxylic acids derived from cyclopentane or cyclohexane, such as cyclopentane carboxylic acids, methylcyclopentane carboxylic acids, dimethylcyclopentane carboxylic acids, cyclohexane carboxylic acids, methylcyclohexane carboxylic acids etc.; moreover, mercuric salts of aromatic carboxylic acids, such as benzoic acid, o-, m- and p-toluylic acid etc. There may also be used mercuric salts of strong inorganic acids, for example mercuric chloride, mercuric sulfate, mercuric nitrate, mercuric bromide etc. Of course, also mixtures of the aforesaid mercuric salts are suitable. In the process of this invention it is only necessary to pass a mixture of ethylenes of the first and second type as defined hereinabove through an aqueous or alcoholic solution or suspension of the above mercury salts. As alcohols there are particularly suitable paraffin alcohols which are liquid at the reaction temperature, especially those which contain 1–10 carbon atoms (the term paraffin alcohols is intended to include straight chain as well as branched alcohols), such as methanol, ethanol, propanol, isopropanol, the various butanols, pentanols, hexanols, octanols, decanols, etc.

In this process the ethylenes of the first series are retained as chemical compound while pure ethylenes of the second series pass through the washing apparatus without hindrance. The term "alcoholic solution" as used herein is intended to include purely alcoholic and aqueous-alcoholic solutions and also solutions which contain various alcohols. It is not obligatory to dissolve the mercury salts completely, it is rather sufficient to use a suspension of the salts in the aforesaid solvents. The process of this invention is of special importance for purifying tetrafluorethylene from contaminations, especially from difluorethylene. If a mixture of tetrafluorethylene and 1.1-difluorethylene is purified, pure tetrafluorethylene is obtained after having been passed once through an aqueous solution or suspension of mercury salts, and no 1.1-difluorethylene can be detected in the ultra-red spectograph. The process of the invention may be carried out as follows:

The gases may be passed through a mercury salt solution, or the salts may be contacted concurrently or countercurrently with the gases in a trickling column charged with filling material. The gases may also be contacted with the liquid in any desired manner. A stationary or mobile, horizontal or vertical gas washer may, for example, be used.

Example 1

Tetrafluorethylene containing about 0.5–1% of 1.1-difluorethylene was passed at 60° C. through an aqueous about 20% solution of mercury acetate. The gas passing through was ultra-red pure tetrafluorethylene.

Example 2

Trifluorochlorethylene containing about 3% of 1.1-difluoro-2-chlorethylene was passed through methanol containing 10% of mercury acetate. Pure trifluorochlorethylene was obtained at a temperature of 60° C.

Example 3

A mixture of tetrafluorethylene and 1.1-difluorethylene was passed at room temperature through a 10% suspension of mercury oxide in water. 1.1-difluorethylene was removed from the mixture.

Example 4

A mixture of tetrafluoroethylene and 1.1-difluorethylene was passed at room temperature through a 10% suspension of mercuric chloride in methanol. 1.1-difluorethylene was removed from the mixture.

Example 5

10 grams of mercuric nitrate were dissolved in a mixture containing 50 ml. of dilute nitric acid and 50 ml. of water. A current of 1.1-difluorethylene was passed into this solution at room temperature. After 5 minutes, the temperature of the reaction liquid had risen by 3° C. Absorption of the 1.1-difluorethylene set in.

Example 6

A current of 1.1-difluorethylene was passed into a solution of 10 grams of mercuric sulfate in 50 ml. of 2 N-sulfuric acid and 50 ml. of water. In the course of 5 minutes the solution warmed up by 4° C. The 1.1-difluorethylene was absorbed by the solution.

Example 7

Hexahydrobenzoic acid was dissolved in methanol and the solution obtained was treated with an equivalent amount of mercury oxide. The mercury salt of hexahydrobenzoic acid was obtained at a temperature of about 60° C. A mixture of tetrafluorethylene and 1.1-difluorethylene was passed through a 10% solution of the aforesaid mercury compound; 1.1-difluorethylene was absorbed with evolution of heat.

Example 8

Benzoic acid was dissolved in methanol and the solution obtained was treated with an equivalent amount of mercury oxide to yield the mercury salt of benzoic acid at a temperature of 60° C. A mixture of tetrafluorethylene and 1.1-difluorethylene was passed through a 10% solution of the above mercury benzoate; 1.1-difluorethylene was absorbed with evolution of heat.

Example 9

4.6 grams of mercuric oxide and 10 grams of paratoluic acid were heated with 100 ml. of methanol for a short period with simultaneous formation of the mercuric salt of para-toluic acid. A current of 1.1-difluorethylene was passed into the suspension that had been cooled to room temperature. The absorption of the gas which, also in this case, took place with the evolution of heat, was ascertained by the decrease of the soil substance in the suspension, said soil substance binding the 1.1-difluorethylene with the formation of compounds soluble in methanol.

We claim:

1. A process which comprises separating halogen-containing olefins (A) selected from the group consisting of 1.1-difluorethylene, 1.1-difluoro-2-chlorethylene, 1-fluoro-1-chlorethylene, 1-fluorethylene and mixtures thereof from halogen-containing olefins (B) selected from the group consisting of tetrafluorethylene, trifluorethylene, trifluorochlorethylene, 1.1-difluoro-2.2-dichlorethylene, 1-fluoro-1.2-dichlorethylene and mixtures thereof by contacting mixtures of said olefins (A) and (B) at a temperature in the range from about 0° C. to about 100° C. with mercuric compounds selected from the group consisting of mercuric oxide, mercuric salts of strong inorganic acids, mercuric salts of aliphatic hydrocarbon monocarboxylic acids having from 2 to 10 carbon atoms, mercuric salts of cycloaliphatic hydrocarbon monocarboxylic acids having from 6 to 8 carbon atoms and containing isocyclic rings of 5 to 6 carbon atoms, mercuric salts of aromatic hydrocarbon monocarboxylic acids having from 7 to 8 carbon atoms and mixtures thereof.

2. A process which comprises separating halogen-containing olefins (A) selected from the group consisting of 1.1-difluorethylene, 1.1-difluoro-2-chlorethylene, 1-fluoro-1-chlorethylene, 1-fluorethylene and mixtures thereof from halogen-containing olefins (B) selected from the group consisting of tetrafluorethylene, trifluorethylene, trifluorochlorethylene, 1.1-difluoro-2.2-dichlorethylene, 1-fluoro-1.2-dichlorethylene and mixtures thereof by contacting mixtures of said olefins (A) and (B) at a temperature in the range from about 0° C. to about 100° C. with mercuric compounds selected from the group consisting of mercuric oxide, mercuric salts of strong inorganic acids, mercuric salts of aliphatic hydrocarbon monocarboxylic acids having from 2 to 10 carbon atoms, mercuric salts of cycloaliphatic hydrocarbon monocarboxylic acids having from 6 to 8 carbon atoms and containing isocyclic rings of 5 to 6 carbon atoms, mercuric salts of aromatic hydrocarbon monocarboxylic acids having from 7 to 8 carbon atoms and mixtures thereof, in the presence of a solvent selected from the group consisting of water, a paraffin alcohol having from 1 to 10 carbon atoms and mixtures thereof.

3. A process as defined in claim 1, wherein the mercury compound is mercuric chloride.

4. A process as defined in claim 1, wherein the mercury compound is mercuric acetate.

5. A process as defined in claim 2, wherein the alcohol is methanol.

6. A process as defined in claim 1, wherein the temperature is in the range from about 20 to about 70° C.

7. A process as defined in claim 1, wherein 1.1-difluorethylene is separated from tetrafluorethylene.

8. A process which comprises separating halogen-containing olefins (A) selected from the group consisting of 1.1-difluorethylene, 1.1-difluoro-2-chloroethylene, 1-fluoro-1-chloroethylene, 1-fluorethylene and mixtures thereof from halogen-containing olefins (B) selected from the group consisting of tetrafluorethylene, trifluorethylene, trifluorochlorethylene, 1.1-difluoro-2.2-dichlorethylene, 1-fluoro-1.2-dichlorethylene and mixtures thereof by contacting mixtures of said olefins (A) and (B) at a temperature in the range from about 0° C. to about 100° C. with mercuric acetate in the presence of a solvent selected from the group consisting of water, methanol and mixtures thereof.

9. A process which comprises separating halogen-containing olefins (A) selected from the group consisting of 1.1-difluorethylene, 1.1-difluoro-2-chloroethylene, 1-fluoro-1-chloroethylene, 1-fluorethylene and mixtures thereof from halogen-containing olefins (B) selected from the group consisting of tetrafluorethylene, trifluorethylene, trifluorochlorethylene, 1.1-difluoro-2.2-dichlorethylene, 1-fluoro-1.2-dichlorethylene and mixtures thereof by contacting mixtures of said olefins (A) and (B) at a temperature in the range from about 0°C. to about 100° C. with mercuric acetate in the presence of a solvent selected from the group consisting of water, a paraffin alcohol having from one to ten carbon atoms and mixtures thereof.

10. A process which comprises separating halogen-containing olefins (A) selected from the group consisting of 1.1-difluorethylene, 1.1-difluoro-2-chlorethylene, 1-fluoro-1-chlorethylene, 1-fluorethylene and mixtures thereof from halogen-containing olefins (B) selected from the group consisting of tetrafluorethylene, trifluorethylene, trifluorochlorethylene, 1.1-difluoro-2.2-dichlorethylene, 1-fluoro-1.2-dichlorethylene and mixtures thereof by contacting mixtures of said olefins (A) and (B) at a temperature in the range from about 0° C. to about 100° C. with a mercuric salt of an aliphatic hydrocarbon monocarboxylic acid having from two to ten carbon atoms in the presence of a solvent selected from the group consisting of water, a paraffin alcohol having from one to ten carbon atoms and mixtures thereof.

References Cited in the file of this patent

FOREIGN PATENTS 107,159   Australia _____ Apr. 27, 1939